(12) United States Patent
Chen et al.

(10) Patent No.: US 10,627,660 B2
(45) Date of Patent: Apr. 21, 2020

(54) APPARATUS FOR IDENTIFYING A BINDING MARKER AND DEVICE FOR BINDING

(71) Applicants: BOE TECHNOLOGY GROUP CO., LTD., Beijing (CN); FUZHOU BOE OPTOELECTRONICS TECHNOLOGY CO. LTD., Fuzhou, Fujian (CN)

(72) Inventors: Xi Chen, Beijing (CN); Dongxi Li, Beijing (CN); Jianfeng Yuan, Beijing (CN); Yao Liu, Beijing (CN)

(73) Assignees: BOE TECHNOLOGY GROUP CO., LTD., Beijing (CN); FUZHOU BOE OPTOELECTRONICS TECHNOLOGY CO., LTD., Fuzhou, Fujian (CN)

( * ) Notice: Subject to any disclaimer, the term of this patent is extended or adjusted under 35 U.S.C. 154(b) by 78 days.

(21) Appl. No.: 15/759,167

(22) PCT Filed: Sep. 11, 2017

(86) PCT No.: PCT/CN2017/101199
§ 371 (c)(1),
(2) Date: Mar. 9, 2018

(87) PCT Pub. No.: WO2018/149120
PCT Pub. Date: Aug. 23, 2018

(65) Prior Publication Data
US 2019/0049772 A1 Feb. 14, 2019

(30) Foreign Application Priority Data
Feb. 15, 2017 (CN) .......................... 2017 1 0081397

(51) Int. Cl.
*G02F 1/1333* (2006.01)
*G02F 1/13* (2006.01)

(52) U.S. Cl.
CPC ...... *G02F 1/133308* (2013.01); *G02F 1/1303* (2013.01); *G02F 1/133345* (2013.01); *G02F 2001/133354* (2013.01)

(58) Field of Classification Search
CPC ................. G02F 1/133308; G02F 1/13; G02F 1/133345; G02F 2001/133354
See application file for complete search history.

(56) References Cited

U.S. PATENT DOCUMENTS

| 2010/0002183 A1* | 1/2010 | Fukuda | ................. G02F 1/1303 349/158 |
| 2012/0169981 A1* | 7/2012 | Murata | ............. G02F 1/134363 349/138 |

(Continued)

FOREIGN PATENT DOCUMENTS

| CN | 101403829 A | 4/2009 |
| CN | 101598878 A | 12/2009 |

(Continued)

OTHER PUBLICATIONS

Written Opinion received for PCT Patent Application No. PCT/CN2017/101199, dated Dec. 20, 2017, 8 pages (4 pages of English Translation and 4 pages of Original Document).

(Continued)

*Primary Examiner* — Dominic E Hawkins
(74) *Attorney, Agent, or Firm* — Womble Bond Dickinson (US) LLP

(57) ABSTRACT

The disclosure provides an apparatus for identifying a binding marker and a device for binding. The apparatus for identifying a binding marker comprises an induction unit and an identification unit, the set position of the induction unit corresponding to the binding marker, and the induction unit being capable of inducing a charge when the binding marker is powered, the identification unit being coupled to the induction unit, and used for receiving the charge induced (Continued)

by the induction unit, and identifying the binding marker according to the induced charge. For the apparatus for identifying a binding marker, when the binding marker is powered, the induction unit may induce a charge, the identification unit may identify the binding marker according to the induced charge.

18 Claims, 3 Drawing Sheets

(56) References Cited

U.S. PATENT DOCUMENTS

| | | | | |
|---|---|---|---|---|
| 2013/0321719 | A1* | 12/2013 | Sumida | G02F 1/1333 349/12 |
| 2014/0118911 | A1* | 5/2014 | Tang | G02F 1/133308 361/679.01 |
| 2014/0340601 | A1* | 11/2014 | Cheng | G02F 1/133308 349/42 |
| 2015/0116166 | A1* | 4/2015 | Li | H01Q 1/44 343/720 |
| 2016/0021774 | A1* | 1/2016 | Ha | H05K 7/02 361/679.01 |
| 2016/0266697 | A1* | 9/2016 | Cheng | G06F 3/0416 |
| 2016/0370658 | A1* | 12/2016 | Dong | G02F 1/1345 |
| 2017/0153507 | A1* | 6/2017 | Zhong | G02F 1/133345 |
| 2017/0242290 | A1* | 8/2017 | Jenkins | G02F 1/133385 |
| 2017/0343842 | A1* | 11/2017 | Yan | G02F 1/133345 |

FOREIGN PATENT DOCUMENTS

| | | | |
|---|---|---|---|
| CN | 102608797 A | | 7/2012 |
| JP | 09-096712 A | | 4/1997 |
| KR | 10-2007-0080426 A | | 8/2007 |
| KR | 20070080426 A | * | 8/2007 |

OTHER PUBLICATIONS

International Search Report received for PCT Patent Application No. PCT/CN2017/101199, dated Dec. 20, 2017, 8 pages of Original Document Only.

* cited by examiner

APPARATUS FOR IDENTIFYING A BINDING MARKER AND DEVICE FOR BINDING

RELATED APPLICATION

This application claims the priority of the Chinese patent application No. 201710081397.5 submitted on Feb. 15, 2017, of which the whole content is incorporated herein by reference.

TECHNICAL FIELD

The disclosure relates to the field of display technology, and in particular, to an apparatus for identifying a binding marker and a device for binding.

BACKGROUND

Generally, the four sides of the liquid crystal panel of a liquid crystal display are wrapped by an outer frame, which is generally assembled with the rear shell of the display. The array substrate (TFT substrate) of the liquid crystal panel is set close to the backlight, and the color film substrate (CF substrate) is located on a side of the array substrate away from the backlight. In contrast, as shown in FIG. 1, a liquid crystal display which is frameless on four sides does not contain the outer frame, and the liquid crystal panel is adhered to the middle frame 71 of the backlight 7 by a double-sided adhesive 9, so as to implement the frameless structure of the liquid crystal display. The color film substrate 51 (CF substrate) of the frameless liquid crystal display is set close to the backlight 7, and the array substrate 52 (TFT substrate) is located on a side of the color film substrate 51 away from the backlight 7, and such a structure causes the flexible printed circuit board 8 bound on the array substrate 52 to be wrapped inside the whole display structure, thereby keeping the overall appearance of the liquid crystal display as a frameless structure.

Since the color film substrate 51 (CF substrate) of the liquid crystal display which is frameless on four sides is set close to the backlight 7, and the array substrate 52 (TFT substrate) is located on a side of the color film substrate 51 away from the backlight 7, which is different from the usual way of disposing the substrate of the liquid crystal display, there exist the following problems:

The array substrate 52 is located on a side of the color film substrate 51 away from the backlight 7, the metal wire of the peripheral wiring region of the array substrate 52 is exposed, and the surface of the metal wire will reflect ambient light, thereby affecting the appearance of the display. To avoid that the surface of the metal wire reflect the ambient light, the peripheral wiring region of the array substrate 52 will generally be coated with a black ink material (i.e., a light shielding layer 6), to cover the metal wire of the peripheral wiring region and prevent it from reflecting the ambient light.

However, after the peripheral wiring region of the array substrate 52 is coated with the black ink, it will cover the binding marker 3 of a surface of the array substrate 52 for alignment when binding the flexible printed circuit board 8, such that the flexible printed circuit board 8 may not be aligned normally at the time of binding. To cause the camera of a device for binding to be capable of identifying the binding marker 3 through the black ink material, there are two solutions currently. One is to require that the coated black ink material has a certain transmittance in a certain wavelength range. This solution needs a specific black ink material, and has a higher requirement for the coating thickness, and the process requirements for a related coating device are also relatively high. As shown in FIG. 2, the other solution is that the region of the binding marker 3 is not coated with the black ink material, and the other peripheral wiring region is coated with the black ink material. Such a solution will affect the appearance of the display due to the design of the binding marker region opening 10.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. In addition, the claimed subject matter is not restricted to implementations that solve any or all of the disadvantages mentioned in any part of the disclosure.

The disclosure provides an apparatus for identifying a binding marker, comprising an induction unit and an identification unit, the set position of the induction unit corresponding to the binding marker, and the induction unit being capable of inducing a charge when the binding marker is powered, the identification unit being coupled to the induction unit, and used for receiving the charge induced by the induction unit, and identifying the binding marker according to the induced charge.

Alternatively or additionally, the induction unit comprises an insulating substrate and a plurality of conductive sheets set on the insulating substrate, and the plurality of conductive sheets are spaced apart from each other and arranged in an array, and each of the conductive sheets is coupled to a signal line which is used for passing the charge induced on the conductive sheet to the identification unit.

Alternatively or additionally, the conductive sheets are located on the same side of the insulating substrate.

Alternatively or additionally, the insulating substrate is located in regions spaced apart from each other between the conductive sheets.

Alternatively or additionally, one part of the conductive sheets is located on one side of the insulating substrate, and the other part of the conductive sheets is located on the other side of the insulating substrate.

Alternatively or additionally, the area of the orthographic projection of the induction unit on a plane where the binding marker is located is larger than the area of the binding marker.

Alternatively or additionally, both the sizes and shapes of the plurality of conductive sheets are identical, and the area of the binding marker is n times the area of one of the conductive sheets, wherein n is an integer larger than 10.

Alternatively or additionally, the identification unit comprises a reception module and a conversion module, and the reception module is coupled to the signal line, and used for receiving the charge induced by each of the conductive sheets, and the conversion module is coupled to the reception module, and used for converting the charge induced by each of the conductive sheets into the voltage difference between each of the conductive sheets and the binding marker, and determining the graphic of the binding marker according to the voltage difference.

Alternatively or additionally, there is further comprised a power unit which is used for applying an electric signal to the binding marker.

Alternatively or additionally, the conductive sheets and the binding marker employ the same conductive material.

Alternatively or additionally, the binding marker is set on the light output side of the display panel, and the side of the binding marker facing away from the display panel is covered with a light shielding layer, and the induction unit is set facing the light shielding layer.

Alternatively or additionally, the binding marker is located in the frame region of the display panel, there are comprised a plurality of said binding markers, the plurality of said binding markers are electrically coupled to each other, and on one of the binding markers is coupled a leading line which is used for introducing an electric signal to the binding markers to power the binding markers.

Alternatively or additionally, the display panel comprises a control circuit which is used for applying an electric signal to the binding marker.

The disclosure further provides a device for binding, comprising any of the above apparatuses for identifying a binding marker.

DETAILED DESCRIPTION

Figure 1:
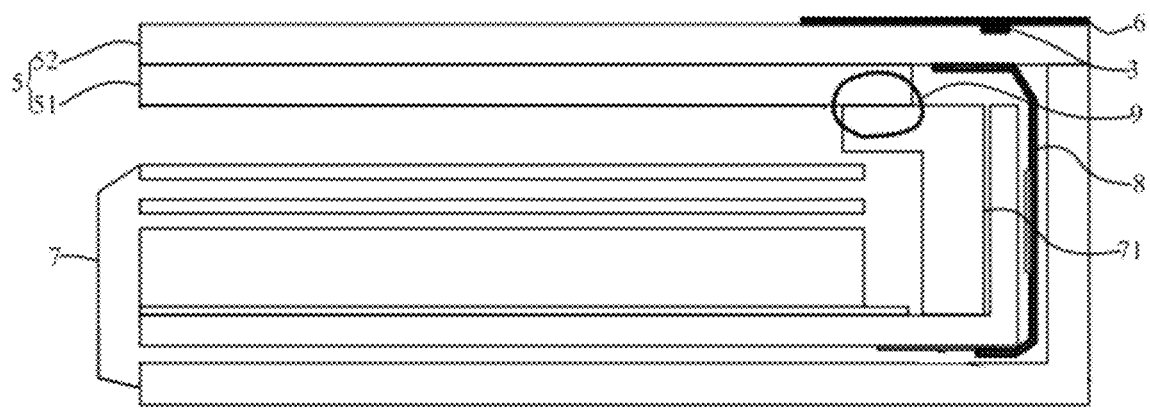
FIG. 1 is a sectional view of the structure of a frameless liquid crystal display in a reference.
Figure 2:
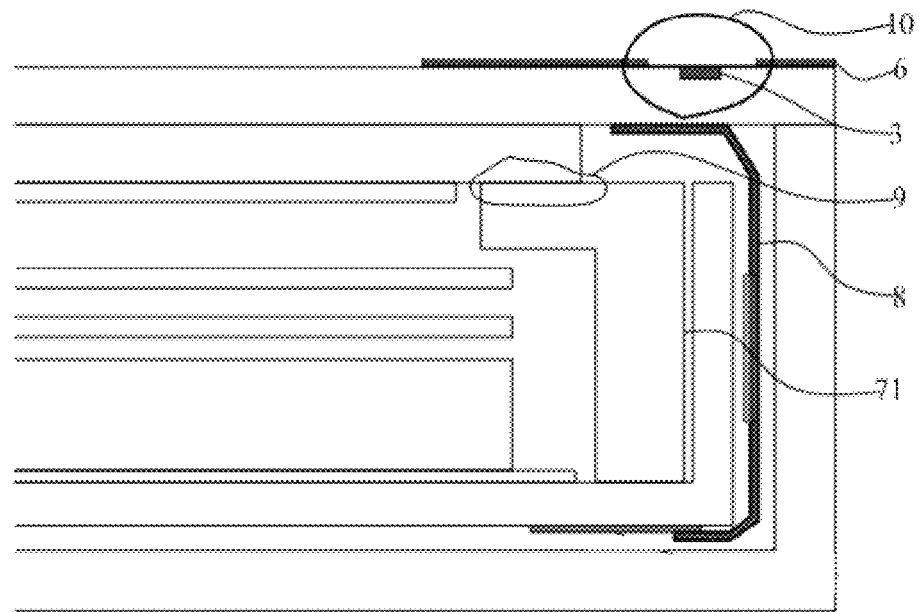
FIG. 2 is a sectional view of the structure of another frameless liquid crystal display in reference.

In order to make the person having ordinary skill in the art better understand the technical solution of the disclosure, in the following, an apparatus for identifying a binding marker and a device for binding provided by the disclosure will be further described in detail in conjunction with the drawings and the particular embodiments.

Therein, the reference signs are as follows:
1 Induction unit
11 Insulating substrate
12 Conductive sheet
2 Identification unit
21 Reception module
22 Conversion module
3 Binding marker
31 leading line
4 Power unit
5 Display panel
51 Color film substrate
52 Array substrate
6 Light shielding layer
7 Backlight
71 Middle frame
8 Flexible printed circuit board
9 Double-sided adhesive
10 Binding marker region opening.

Embodiment One

Figure 3:
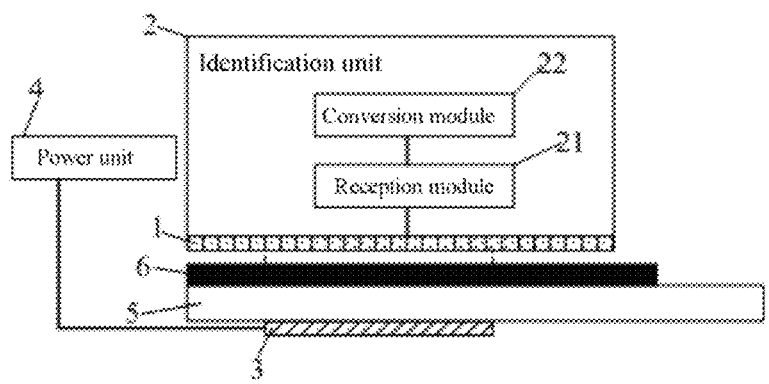
FIG. 3 is a sectional view of the structure of an apparatus for identifying a binding marker in embodiment One of the disclosure.

This embodiment provides an apparatus for identifying a binding marker. As shown in FIG. 3, the apparatus for identifying comprises an induction unit 1 and an identification unit 2, the set position of the induction unit 1 corresponding to the binding marker 3, and the induction unit 1 being capable of inducing a charge when the binding marker 3 is powered, the identification unit 2 being coupled to the induction unit 1, and used for receiving the charge induced by the induction unit 1, and identifying the binding marker 3 according to the induced charge.

Therein, the binding marker 3 is formed employing a conductive material. By setting the induction unit 1 and the identification unit 2, when the binding marker 3 is powered, the induction unit 1 may induce a charge, the identification unit 2 may identify the binding marker 3 according to the induced charge, thereby it may be achieved that the binding marker 3 may be normally identified even if it is covered with black ink, and in turn, the display appearance problem brought about by the design of the binding marker 3 opening in the reference (that is, the binding marker 3 is not shielded) is avoided, and meanwhile, it is avoided that a black ink material which may transmit light in a certain wavelength range is employed in the reference, thereby avoiding the problem of high process requirements brought about by employing such a black ink material.

Figure 4:
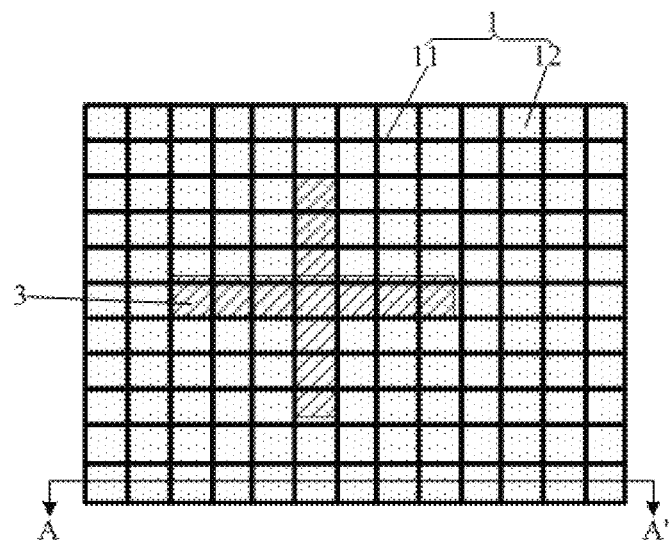
FIG. 4 is a top view of the structure of an induction unit in embodiment One of the disclosure.
Figure 5:
FIG. 5 is a sectional view of the structure of the induction unit along the section line AA' in FIG. 4.

In this embodiment, as shown in FIG. 4 and FIG. 5, the induction unit 1 comprises an insulating substrate 11 and a plurality of conductive sheets 12 set on the insulating substrate 11, and the plurality of conductive sheets 12 are spaced apart from each other and arranged in an array, and each of the conductive sheets 12 is coupled to a signal line (not shown in the figures) which is used for passing the charge induced on the conductive sheet 12 to the identification unit 2.

In this embodiment, the identification unit 2 comprises a reception module 21 and a conversion module 22, and the reception module 21 is coupled to the signal line, and used for receiving the charge induced by each of the conductive sheets 12. The conversion module 22 is coupled to the reception module 21, and used for converting the charge induced by each of the conductive sheets 12 into the voltage difference between each of the conductive sheets 12 and the binding marker 3, and determining the graphic of the binding marker 3 according to the voltage difference.

Therein, the principle of induction of the binding marker 3 by the induction unit 1 employs the principle of capacitance induction, that is, when the binding marker 3 is powered, the conductive sheet 12 set corresponding to the binding marker 3 will induce a charge, and the conductive sheets 12 aligned with the binding marker 3 will induce charges with the same amount as but with the opposite polarity to the charges on the binding marker 3, whereas conductive sheets 12 non-aligned with the binding marker 3 will also induce charges with the opposite polarity to the charges on the binding marker 3, however, the amount of charges induced on the conductive sheets 12 non-aligned with the binding marker 3 is far less than the amount of charges on the binding marker 3, this causes that the voltage difference between the conductive sheets 12 aligned with the binding marker 3 and the binding marker 3 is larger than the voltage difference between the conductive sheets 12 non-aligned with the binding marker 3 and the binding marker 3, and the identification unit 2 identifies the voltage difference, and thereby may identify the graphic of the binding marker 3. By employing the principle of capacitance induction to identify the binding marker 3, it may be achieved that the binding marker 3 is normally identified even if it is covered by black ink, such that the binding marker 3 may be covered by black ink which prevents light transmission, and in turn, the display appearance problem brought about by the design of the binding marker 3 opening in the reference (that is, the binding marker 3 is not shielded) is avoided, and meanwhile, it is avoided that a black ink material which may transmit light in a certain wavelength range is employed, thereby avoiding the problem of high process requirements brought about by employing such a black ink material.

Alternatively or additionally, in this embodiment, the conductive sheets 12 are located on the same side of the insulating substrate 11.

Figure 6:
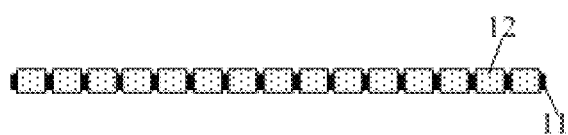
FIG. 6 is a sectional view of the structure of another induction unit in embodiment One of the disclosure.

It is noted that in this embodiment, the insulating substrate 11 may also be located in regions spaced apart from each other between the conductive sheets 12 (as shown in FIG. 6).

In this embodiment, the area of the orthographic projection of the induction unit 1 on a plane where the binding marker 3 is located is larger than the area of the binding marker 3. As such, when identifying the binding marker 3, the induction unit 1 may be made to very easily correspond to the binding marker 3, thereby improving the alignment accuracy of the induction unit 1 and the binding marker 3, and in turn making it easier to identify the binding marker 3, and improving the efficiency of identifying the binding marker 3.

Alternatively or additionally, the sizes and shapes of the plurality of conductive sheets 12 are identical, and the area of the binding marker 3 is n times the area of one of the conductive sheets 12, wherein n is an integer larger than 10. When set as such, the larger the value of n is, the higher the accuracy of the graphic of the binding marker 3 formed by simulated splicing after the conductive sheets 12 induce the powered binding marker 3 is, and thereby the accuracy of identifying the binding marker 3 may be improved.

In this embodiment, the apparatus for identifying a binding marker further comprises a power unit 4 which is used for applying an electric signal to the binding marker 3. Therein, when it is needed to identify the binding marker 3, the power unit 4 applies the electric signal to the binding marker 3.

In this embodiment, the conductive sheets 12 and the binding marker 3 employ the same conductive material. For example, the binding marker 3 is usually made employing the same material as the grid, and the conductive sheets 12 are also made employing the same material as the grid. As such, it is beneficial to the conductive sheets 12 inducting the powered binding marker 3. Of course, the conductive materials employed by the conductive sheets 12 and the binding marker 3 may also be different.

In this embodiment, as shown in FIG. 3, the binding marker 3 is set on the light output side of the display panel 5, and the side of the binding marker 3 facing away from the display panel 5 is covered with a light shielding layer 6, and the induction unit is set facing the light shielding layer 6. Therein, the light shielding layer 6 employs black ink. As shown in FIG. 1, the four sides of the display panel 5 are frameless, and the display panel 5 is adhered to the middle frame 71 of the backlight 7 by a double-sided adhesive. The color film substrate 51 of the display panel 5 is set close to the backlight 7, and the array substrate 52 is located on a side of the color film substrate 51 away from the backlight 7, causing the flexible printed circuit board 8 bound on the array substrate 52 to be wrapped inside the display structure constituted by the display panel 5 and the backlight 7. Since the metal wire of the peripheral wiring region of the array substrate 52 facing outwards is exposed and will reflect ambient light, the setting of the light shielding layer 6 may block the metal wire of the peripheral wiring region, thereby avoiding that the exposed metal wire reflects the ambient light and causing the appearance of the display panel 5 not to be affected.

Figure 7:
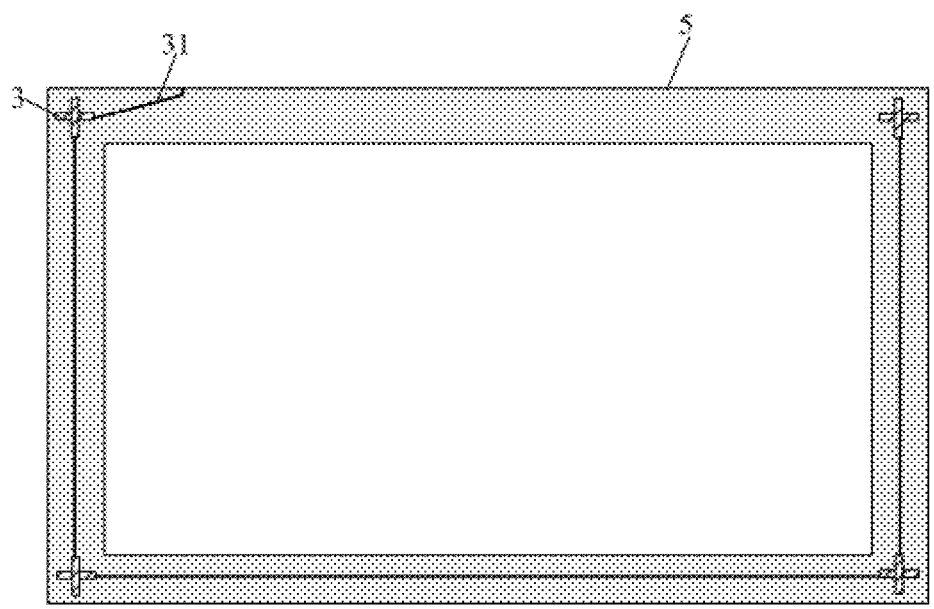
FIG. 7 is a top view of the set position of the binding marker on the display panel in embodiment One of the disclosure.

In this embodiment, as shown in FIG. 7, the binding marker 3 is located in the frame region of the display panel 5, there are comprised a plurality of binding markers 3, the plurality of binding markers 3 are electrically coupled to each other, and on one of the binding markers 3 is coupled a leading line 31 which is used for introducing an electric signal to the binding markers 3 to power the binding markers 3. Such a setting may cause all the binding markers 3 to be all powered by the leading line 31 introducing an electric signal, thereby causing the loading of the electric signal on the binding markers 3 more convenient. The leading line 31 may be formed at the same time as the binding markers 3 in a one-time patterning process, the preparation process is simple and the preparation cost is low. In an actual power-up procedure, the electric signal may be applied to all the binding markers 3, as long as the power unit 4 is made to be in contact with the leading line 31.

It is noted that, the display panel 5 comprises a control circuit (not shown in the figures) which is used for applying an electric signal to the binding marker 3. That is, the electric signal on the binding marker 3 may also be applied by the control circuit in the display panel 5. Namely, in an actual power-up procedure, the electric signal may be applied to all the binding markers 3, as long as the control circuit is made to be in contact with the leading line 31.

Embodiment Two

Figure 8:
FIG. 8 is a sectional view of the structure of an induction unit in embodiment Two of the disclosure.

This embodiment provides an apparatus for identifying a binding marker. Unlike embodiment One, as shown in FIG. 8, one part of the conductive sheets 12 is located on one side of the insulating substrate 11, and the other part of the conductive sheets 12 is located on the other side of the insulating substrate 11.

In this embodiment, the other structures of the apparatus for identifying a binding marker are the same as in embodiment One, and will not be repeated here any longer.

The beneficial effects of the embodiments One and Two are as follows. For the apparatus for identifying a binding marker provided in the embodiments One and Two, by setting an induction unit and an identification unit, when the binding marker is powered, the induction unit may induce a charge, the identification unit may identify the binding marker according to the induced charge, thereby it may be achieved that the binding marker may be normally identified even if it is covered by black ink, and in turn, the display appearance problem brought about by the design of the binding marker opening in the reference (that is, the binding marker is not shielded) is avoided, and meanwhile, it is avoided that a black ink material which may transmit light in a certain wavelength range is employed in the reference, thereby avoiding the problem of high process requirements brought about by employing such a black ink material.

Embodiment Three

This embodiment provides a device for binding, comprising an apparatus for identifying a binding marker in embodiment One or Two.

By employing the apparatus for identifying a binding marker in embodiment One or Two, the device for binding is caused to be capable of normally identifying a binding marker even if it is covered by black ink, and thereby the device for binding is made to be capable of conducting normal alignment binding for a flexible printed circuit board even if the binding marker is covered by the black ink.

It may be appreciated that, the above embodiments are exemplary embodiments employed for the purpose of illustrating the principles of the invention, and however, the invention is not limited thereto. For those people having ordinary skills in the art, various variations and improvements may be made without departing from the spirit and substance of the invention, and these variations and improvements are also construed as falling within the protection scope of the invention.

What is claimed is:

1. An apparatus for identifying a binding marker, comprising an induction unit and an identification unit, the set position of the induction unit corresponding to the binding marker, and the induction unit being capable of inducing a charge when the binding marker is powered, the identification unit being coupled to the induction unit, and used for receiving the charge induced by the induction unit, and identifying the binding marker according to the induced charge, wherein the induction unit comprises an insulating substrate and a plurality of conductive sheets set on the insulating substrate, and the plurality of conductive sheets are spaced apart from each other and arranged in an array, and each of the conductive sheets is coupled to a signal line which is used for passing the charge induced on the conductive sheet to the identification unit.

2. The apparatus for identifying a binding marker as claimed in claim 1, wherein the conductive sheets are located on the same side of the insulating substrate.

3. The apparatus for identifying a binding marker as claimed in claim 1, wherein the insulating substrate is located in regions spaced apart from each other between the conductive sheets.

4. The apparatus for identifying a binding marker as claimed in claim 1, wherein one part of the conductive sheets is located on one side of the insulating substrate, and the other part of the conductive sheets is located on the other side of the insulating substrate.

5. The apparatus for identifying a binding marker as claimed in claim 1, wherein an area of the orthographic projection of the induction unit on a plane where the binding marker is located is larger than the area of the binding marker.

6. The apparatus for identifying a binding marker as claimed in claim 1, wherein both the sizes and shapes of the plurality of conductive sheets are identical, and an area of the binding marker is n times the area of one of the conductive sheets, wherein n is an integer larger than 10.

7. The apparatus for identifying a binding marker as claimed in claim 1, wherein the identification unit comprises a reception module and a conversion module, and the reception module is coupled to the signal line, and used for receiving the charge induced by each of the conductive sheets, and the conversion module is coupled to the reception module, and used for converting the charge induced by each of the conductive sheets into the voltage difference between each of the conductive sheets and the binding marker, and determining the graphic of the binding marker according to the voltage difference.

8. The apparatus for identifying a binding marker as claimed in claim 1, further comprising a power unit which is used for applying an electric signal to the binding marker.

9. The apparatus for identifying a binding marker as claimed in claim 1, wherein the conductive sheets and the binding marker employ the same conductive material.

10. The apparatus for identifying a binding marker as claimed in claim 1, wherein a binding marker is set on the light output side of a display panel, and the side of the binding marker facing away from the display panel is covered with a light shielding layer, and the induction unit is set facing the light shielding layer.

11. The apparatus for identifying a binding marker as claimed in claim 10, wherein the binding marker is located in the frame region of the display panel, there are comprised a plurality of said binding markers, the plurality of said binding markers are electrically coupled to each other, and on one of the binding markers is coupled a leading line which is used for introducing an electric signal to the binding markers to power the binding markers.

12. The apparatus for identifying a binding marker as claimed in claim 10, wherein the display panel comprises a control circuit which is used for applying an electric signal to the binding marker.

13. A device for binding, comprising an apparatus for identifying a binding marker, the binding marker comprising an induction unit and an identification unit, the set position of the induction unit corresponding to the binding marker, and the induction unit being capable of inducing a charge when the binding marker is powered, the identification unit being coupled to the induction unit, and used for receiving the charge induced by the induction unit, and identifying the binding marker according to the induced charge, wherein the induction unit comprises an insulating substrate and a plurality of conductive sheets set on the insulating substrate, and the plurality of conductive sheets are spaced apart from each other and arranged in an array, and each of the conductive sheets is coupled to a signal line which is used for passing the charge induced on the conductive sheet to the identification unit.

14. The device of claim 13, wherein the conductive sheets are located on the same side of the insulating substrate.

15. The device of claim 13, wherein the insulating substrate is located in regions spaced apart from each other between the conductive sheet.

16. The device of claim 13, wherein one part of the conductive sheets is located on one side of the insulating substrate and the other part of the conductive sheets is located on the other side of the insulating substrate.

17. The device of claim 13, wherein an area of the orthographic projection of the induction unit on a plane where the binding marker is located is larger than the area of the binding marker.

18. The device of claim 13, wherein both the sizes and shapes of the plurality of conductive sheets are identical, and an area of the binding marker is n times the area of one of the conductive sheets, wherein n is an integer larger than 10.

* * * * *